(12) United States Patent
Hecht et al.

(10) Patent No.: US 10,953,474 B2
(45) Date of Patent: Mar. 23, 2021

(54) INSERT HOLDER HAVING TRANSVERSELY ORIENTED INSERT RECEIVING POCKET WITH RESILIENT UPPER JAW HAVING OUTER FLEXIBILITY GROOVE AND CUTTING TOOL

(71) Applicant: Iscar, Ltd., Tefen (IL)

(72) Inventors: Gil Hecht, Nahariya (IL); David Ben Harouche, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 102 days.

(21) Appl. No.: 16/357,565

(22) Filed: Mar. 19, 2019

(65) Prior Publication Data

US 2020/0298319 A1  Sep. 24, 2020

(51) Int. Cl.
   *B23B 27/16* (2006.01)
   *B23B 27/04* (2006.01)
   (Continued)

(52) U.S. Cl.
   CPC .......... *B23B 27/1611* (2013.01); *B23B 27/04* (2013.01); *B23B 29/025* (2013.01); *B23B 29/046* (2013.01);
   (Continued)

(58) Field of Classification Search
   CPC ... B23B 27/1611; B23B 27/04; B23B 29/043; B23B 29/046; B23B 2205/02; B23B 2205/12
   See application file for complete search history.

(56) References Cited

U.S. PATENT DOCUMENTS 5,159,863 A   11/1992  Simpson, III
5,833,403 A   11/1998  Barazani
              (Continued)

FOREIGN PATENT DOCUMENTS

DE   86 09 264 U1   5/1986
EP   0 477 480 A2   4/1992
              (Continued)

OTHER PUBLICATIONS

International Search Report dated Jun. 22, 2020, issued in PCT counterpart application (No. PCT/IL2020/050199).
              (Continued)

*Primary Examiner* — Alan Snyder
(74) *Attorney, Agent, or Firm* — Womble Bond Dickinson (US) LLP (57) ABSTRACT

A cutting tool includes a cutting insert resiliently clamped in an insert holder. The insert holder has a holder longitudinal axis defining opposite forward to rearward directions, and a transversely oriented insert receiving pocket having a pocket longitudinal axis and a pocket front opening. The insert holder includes a forwardly located insert mounting portion that includes upper and lower jaws which together define the insert receiving pocket. The insert receiving pocket at the lower jaw includes a pocket lower clamping surface. The insert receiving pocket at the upper jaw includes a pocket upper clamping surface which faces mutually towards the pocket lower clamping surface. The insert receiving pocket at one of the upper and lower jaws includes a pocket stopper surface facing generally towards the pocket front opening. The upper jaw includes an outer flexibility groove recessed in the holder peripheral surface.

37 Claims, 7 Drawing Sheets

(51) Int. Cl.
  *B23B 29/02*     (2006.01)
  *B23B 29/04*     (2006.01)
  *B23B 29/22*     (2006.01)

(52) U.S. Cl.
  CPC ........... *B23B 29/22* (2013.01); *B23B 2205/12* (2013.01); *B23B 2260/0785* (2013.01)

(56) References Cited

U.S. PATENT DOCUMENTS

| | | |
|---|---|---|
| 9,033,622 B2 | 5/2015 | Hecht |
| 2010/0067992 A1 | 3/2010 | Uchijo et al. |
| 2011/0255926 A1 | 10/2011 | Hecht |
| 2012/0070241 A1 | 3/2012 | Heckel et al. |
| 2013/0294854 A1 | 11/2013 | Lee |
| 2017/0333997 A1 | 11/2017 | Kusuda |
| 2019/0047057 A1 | 2/2019 | Breisch et al. |

FOREIGN PATENT DOCUMENTS

| | | | |
|---|---|---|---|
| EP | 0477480 A2 | 4/1992 | |
| EP | 3144086 A1 * | 3/2017 | ........... B23B 29/043 |
| JP | 2006-263845 | 10/2006 | |

OTHER PUBLICATIONS

Written Opinion dated Jun. 22, 2020, issued in PCT counterpart application (No. PCT/IL2020/050199).

* cited by examiner

INSERT HOLDER HAVING TRANSVERSELY ORIENTED INSERT RECEIVING POCKET WITH RESILIENT UPPER JAW HAVING OUTER FLEXIBILITY GROOVE AND CUTTING TOOL

FIELD OF THE INVENTION

The subject matter of the present application relates to cutting tools, and in particular to cutting tools designed for internal cutting operations on a workpiece, of the type in which a cutting insert is releasably clamped, and in particular resiliently clamped, in a transversely oriented insert receiving pocket provided on an insert holder.

BACKGROUND OF THE INVENTION

Cutting tools for internal cutting operations on a workpiece can include an insert holder, and a cutting insert releasably and resiliently clamped in a transversely oriented insert receiving pocket. The insert holder can include upper and lower jaws spaced apart by a clamping recess with the insert receiving pocket located in the clamping recess.

An example of such an insert receiving pocket is disclosed in, for example, EP 0 477 480 A2.

SUMMARY OF THE INVENTION

In accordance with a first aspect of the subject matter of the present application there is provided an elongated insert holder, having a holder longitudinal axis defining opposite forward to rearward directions, the insert holder comprising:

a holder peripheral surface extending circumferentially about the holder longitudinal axis, the holder peripheral surface intersecting, and forming a boundary of, a holder end surface at a forward end of the insert holder;

a shank portion and an insert mounting portion located at a forward end thereof, the insert mounting portion comprising:

upper and lower jaws which are spaced apart by a clamping recess, the clamping recess being recessed in the holder end surface and opening out to the holder peripheral surface at first and second recess side openings, the upper jaw being resiliently movable with respect to the lower jaw by rotating around a pivot axis; and a transversely oriented insert receiving pocket configured to receive a cutting insert therein, the insert receiving pocket being formed in the clamping recess and defined, at least partially, by pocket upper and lower surfaces formed on the upper and lower jaws, respectively, and extending longitudinally along a pocket longitudinal axis to the first recess side opening to define a pocket front opening; wherein:

a pocket longitudinal plane located between the pocket upper and lower surfaces contains the pocket longitudinal axis;

the pocket lower surface comprises a pocket lower clamping surface;

the pocket upper surface comprises a pocket upper clamping surface which faces mutually towards the pocket lower clamping surface;

the insert receiving pocket comprises a pocket stopper surface formed at one of the pocket upper and lower surfaces, facing generally towards the pocket front opening; and the upper jaw comprises an outer flexibility groove recessed in the holder peripheral surface.

In accordance with a second aspect of the subject matter of the present application there is provided a cutting tool comprising:

an insert holder of the type described above; and a cutting insert, releasably and resiliently clamped in the insert receiving pocket (46).

It is understood that the above-said is a summary, and that features described hereinafter may be applicable in any combination to the subject matter of the present application, for example, any of the following features may be applicable to the insert holder or cutting tool:

The pocket stopper surface can be formed at the pocket lower surface.

The insert receiving pocket can be oriented along a transverse pocket plane which contains the pocket longitudinal axis, and which intersects the pocket upper and lower surfaces. The transverse pocket plane can be transverse to the holder longitudinal axis.

The transverse pocket plane can be perpendicular to the holder longitudinal axis.

The insert receiving pocket can open out to the holder end surface.

The insert holder can comprise an upper support rib which protrudes from the holder peripheral surface and is located on the upper jaw adjacent the pocket front opening.

The insert holder can comprise a lower support rib which protrudes from the holder peripheral surface and is located on the lower jaw adjacent the pocket front opening.

The upper jaw can be configured to resiliently clamp a cutting insert in the insert receiving pocket without the use of an additional, separate clamping device.

The insert holder can comprise a resilience slot formed in the clamping recess and extending rearwardly from the insert receiving pocket.

The resilient slot can comprise a forwardmost resilience slot portion which extends from the second recess side opening to the insert receiving pocket along the holder end surface.

The insert mounting portion can comprise a key slot formed in the clamping recess which extends from the holder peripheral surface to the insert receiving pocket along the holder end surface so that the key slot and the forwardmost resilience slot portion can form a forwardly projecting stopper projection upon which the pocket stopper surface can be located.

The resilience slot can comprise a slot stress relief groove at which it terminates in the rearward direction. The slot stress relief groove can extend along the pivot axis.

The clamping recess can be defined by opposite recess upper and lower surfaces formed on the upper and lower jaws, respectively. The upper jaw can comprise an inner flexibility groove recessed in the recess upper surface.

The inner flexibility groove can open out to the holder end surface at an inner flexibility groove opening and extends to beyond the insert receiving pocket in the rearward direction of the insert holder.

The outer flexibility groove can extend to beyond the insert receiving pocket in the rearward direction of the insert holder.

The pocket longitudinal plane can be perpendicular to the transverse pocket plane. The holder peripheral surface can comprise a peripheral recessed surface extending from the outer flexibility groove to the holder end surface, the peripheral recessed surface sloping towards the pocket longitudinal plane in the forward direction.

The peripheral recessed surface can be planar.

The pivot axis can be non-perpendicular to the holder longitudinal axis.

The outer flexibility groove can be oriented transversely to the holder longitudinal axis.

The outer flexibility groove can comprise opposite first and second outer flexibility groove ends formed at opposite longitudinal extremities thereof, the first groove opening being adjacent the first recess opening and the second outer flexibility groove end being adjacent the second recess opening.

The first outer flexibility groove end can be further from the holder end surface than the second outer flexibility groove end.

The outer flexibility groove can comprise two opposite first and second lateral groove surfaces extending between the first and second outer flexibility groove ends, the first lateral groove surface being closer to the holder end surface than the second lateral groove surface. The first lateral groove surface can be convexly curved.

The first lateral groove surface can intersect the holder end surface.

The outer flexibility groove can extend longitudinally along a groove axis.

The groove axis can form a non-zero groove angle with the holder longitudinal axis.

The groove angle can be greater or equal to 30° and less than or equal to 80°, preferably, greater or equal to 50° and less than or equal to 70°.

The groove axis can be parallel to the pivot axis.

In a top view of the tool holder normal to the pocket longitudinal plane, the outer flexibility groove has a maximum groove width measured perpendicular to the groove axis between the two lateral extremities of the outer flexibility groove. In a first side view of the tool holder along the pocket longitudinal axis, the insert receiving pocket has a pocket width measured perpendicular to the pocket longitudinal axis. The maximum groove width can be greater than the pocket width.

The maximum groove width can be greater or equal to 2 mm and less than or equal to 3.5 mm.

In a top view of the tool holder normal to the pocket longitudinal plane, the outer flexibility groove has a maximum groove length measured parallel to the groove axis between the two longitudinal extremities of the outer flexibility groove, and the insert holder has a holder width measured perpendicular to the holder longitudinal axis. The maximum groove length can be greater than half the holder width.

The maximum groove length can be greater or equal to 4 mm and less than or equal to 5.5 mm.

In a perspective view of the tool holder along the groove axis, the outer flexibility groove has a maximum groove depth relative to the holder peripheral surface measured in a direction perpendicular to the groove axis, and the upper jaw has an upper jaw height at the outer flexibility groove measured in the same direction as the maximum groove depth. The maximum groove depth can be greater than half the upper jaw height.

The maximum groove depth can be greater or equal to 0.5 mm and less than or equal to 2 mm.

The shank portion and the insert mounting portion can be integrally formed together to have unitary one-piece construction.

The upper jaw can be devoid of a though hole opening out to the clamping recess and the holder peripheral surface.

The insert holder can have only a single insert receiving pocket. In a front view of the insert holder, the holder longitudinal axis can pass through the insert receiving pocket.

The cutting insert can be longitudinally elongated in a direction defining an insert longitudinal axis and can comprise:
  two opposing insert end surfaces and an insert peripheral surface extending therebetween, the insert peripheral surface extending circumferentially about the insert longitudinal axis and comprising opposing insert upper and lower surfaces and two opposing insert side surfaces which all connect the two insert end surfaces; and
  a cutting edge formed at the intersection of the insert upper surface and a first one of the two insert end surfaces; wherein:
    the insert lower surface comprises an insert lower abutment surface;
    the insert upper surface comprises an insert upper abutment surface which mutually faces away from the at least one insert lower abutment surface; and
  a second one of the two the insert end surfaces comprises an insert stopper surface.

The pocket stopper surface can abut the insert stopper surface. The pocket lower clamping surface can abut the insert lower abutment surfaces. The pocket upper clamping surface can abut the insert upper abutment surface.

The cutting insert can comprise two cutting edges and two insert stopper surfaces so that the cutting insert is double-ended.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
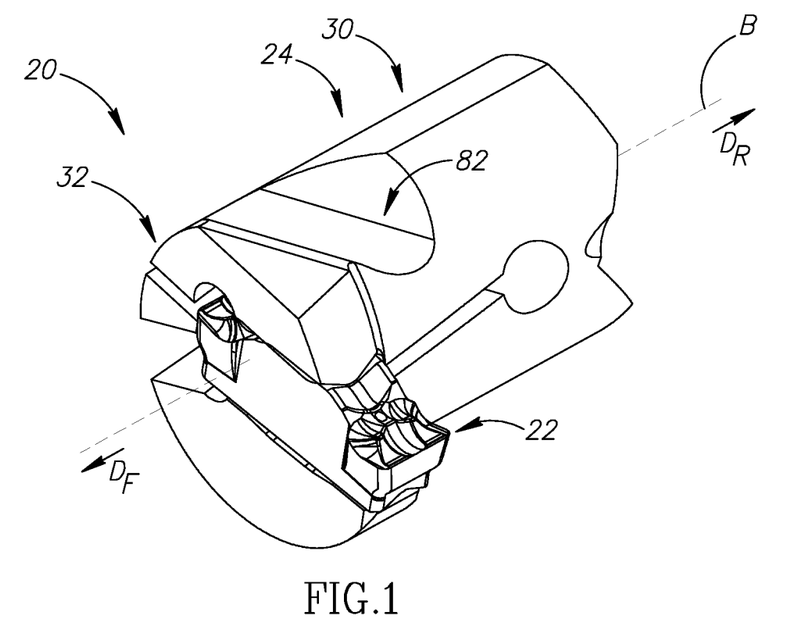
FIG. 1 is a perspective view of a cutting tool.

Attention is first drawn to FIG. 1 showing a cutting tool 20, for chip removal, in accordance with embodiments of the subject matter of the present application. The cutting tool 20 has a cutting insert 22 which can be typically made from cemented carbide. The cutting tool 20 also has an insert holder 24 which can be typically made from steel. In this non-limiting example shown in the drawings, the cutting tool 20 is an internal grooving tool and the cutting insert 22 is a grooving insert. The cutting tool 20 is adjustable between a released position and a fastened position. In the fastened position of the cutting tool 20, the cutting insert 22 is releasably attached to the insert holder 24.

Attention is drawn now to FIGS. 2-6 showing an insert holder 24 in accordance with the present application. The insert holder 24 is elongated along a holder longitudinal axis B that defines opposite forward to rearward directions $D_F$, $D_R$. The insert holder 24 includes a holder peripheral surface 26 that extends circumferentially along the holder longitudinal axis B. The holder peripheral surface 26 intersects, and forms a boundary of, a holder end surface 28 at a forward end of the insert holder 24. The holder longitudinal axis B can intersect the holder end surface 28. It should be appreciated that use of the terms "forward" and "rearward" throughout the description and claims refer to a relative position in a direction of the holder longitudinal axis B towards the left and right, respectively, in FIGS. 4 and 6.

The insert holder 24 includes a shank portion 30 and an insert mounting portion 32 located at a forward end thereof. Both the shank portion 30 and the insert mounting portion 32 are defined circumferentially by the holder peripheral surface 26. In accordance with some embodiments of the subject matter of the present application, the shank portion 30 and the insert mounting portion 32 can be integrally formed together to have unitary one-piece construction. That is to say, the tool holder is devoid of a separate adaptor of the type disclosed in U.S. Pat. No. 5,833,403.

Figure 3:
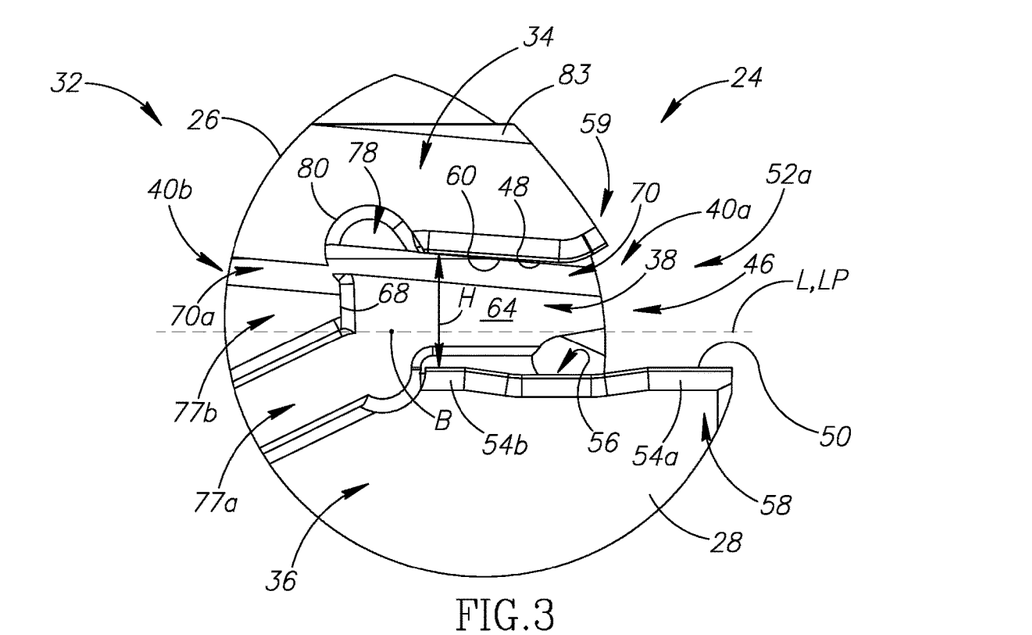
FIG. 3 is a front end view of the insert holder shown in FIG. 2.
Figure 4:
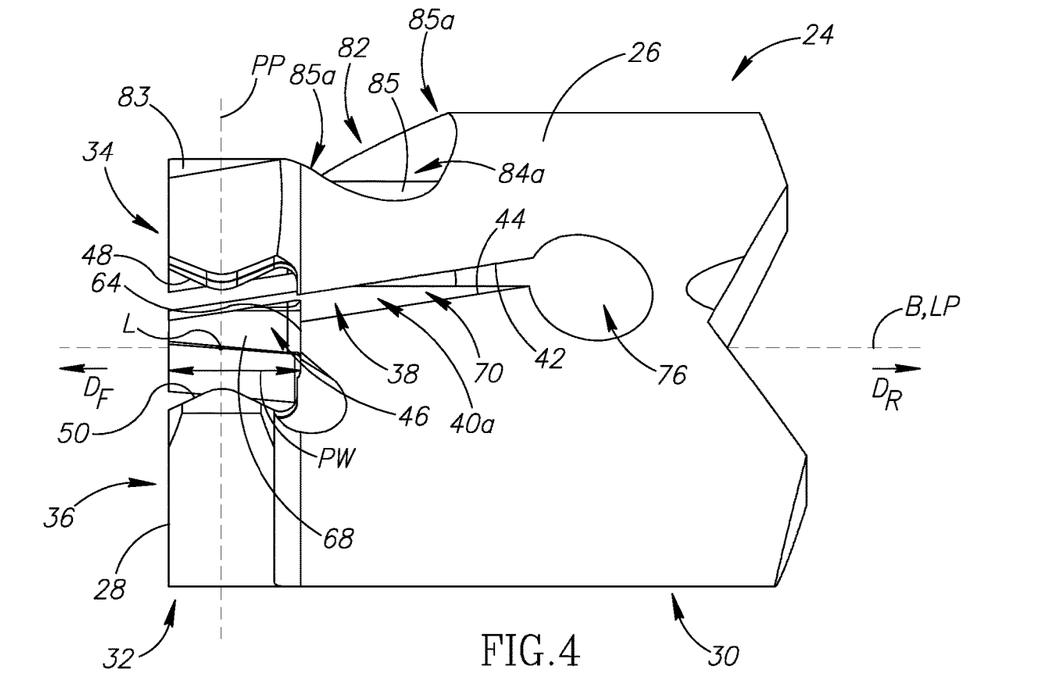
FIG. 4 is a first side view of the insert holder shown in FIG. 2.
Figure 5:
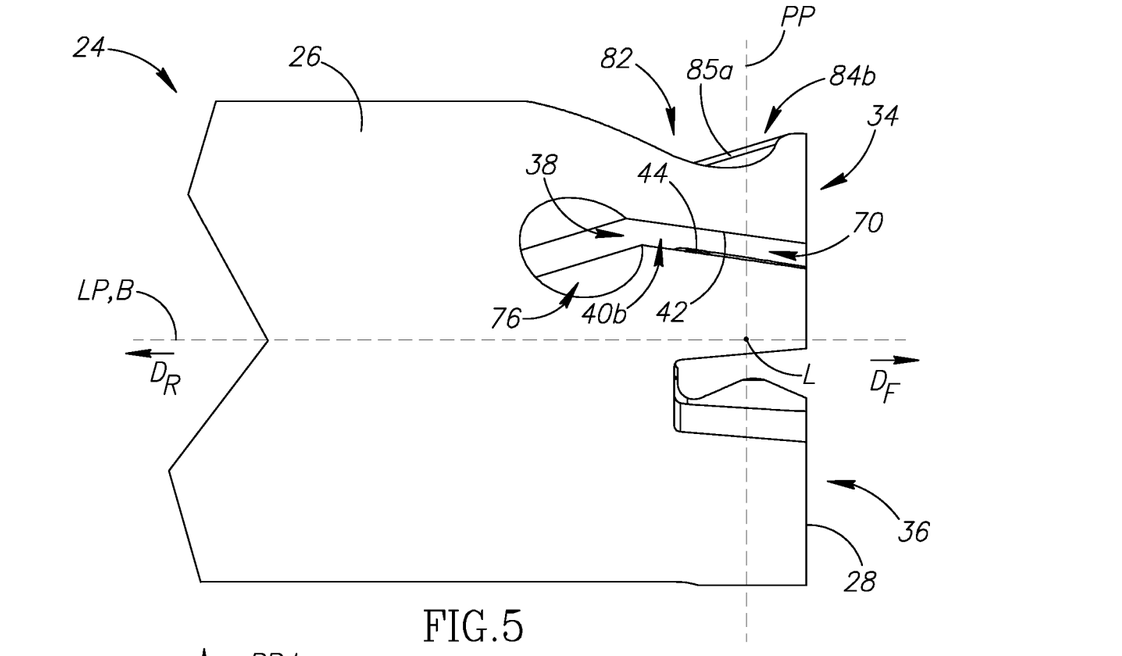
FIG. 5 is a second side view of the insert holder shown in FIG. 2.

Referring to FIG. 3, the holder peripheral surface 26 at the insert mounting portion 32 can be convexly curved. In this non-limiting example shown in the drawings, the holder peripheral surface 26 can have an elliptical cross-section taken in a plane perpendicular to the holder longitudinal axis B. This aids insertion of the cutting tool 20 into round holes. The holder peripheral surface 26 at the shank portion 30 can be convexly curved. It is noted that the insert holder 24 is not in the form of a blade, as known in the art (e.g. as also disclosed in U.S. Pat. No. 9,033,622), and which are suitable for (deep) external grooving.

As seen in FIG. 3, the insert mounting portion 32 includes an upper jaw 34 and a lower jaw 36. In accordance with some embodiments of the subject matter of the present application, the upper and lower jaws 34, 36 can be integrally formed together to have unitary one-piece construction.

Figure 2:
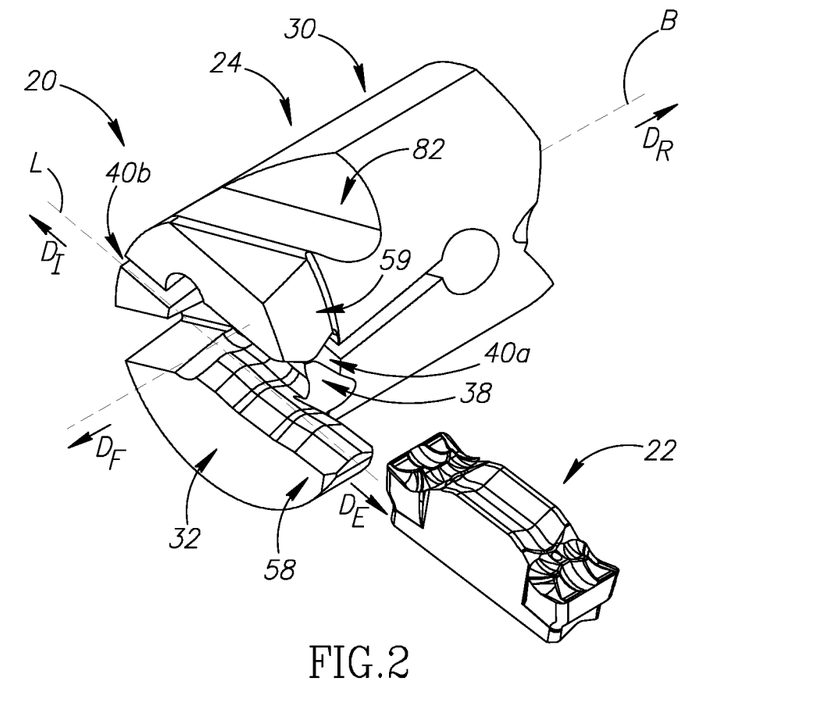
FIG. 2 is a first perspective view of an insert holder shown in FIG. 1.

Referring to FIGS. 2a to 5, the upper and lower jaws 34, 36 are spaced apart by a clamping recess 38. The clamping recess 38 is recessed in the holder end surface 28. The clamping recess 38 extends on the holder end surface 28 to two distinct portions of the holder peripheral surface 26. As seen in FIGS. 2 and 3, the clamping recess 38 includes first and second recess side openings 40a, 40b at which the clamping recess 38 opens out to the holder peripheral surface 26. Generally speaking, the first and second recess side openings 40a, 40b are on opposite sides of the holder peripheral surface 26 along a pocket longitudinal axis L. It is noted that the first and recess second side openings 40a, 40b intersect the holder end surface 28. By virtue of the foregoing configuration the insert holder 24 has a bifurcated form.

Figure 2A:
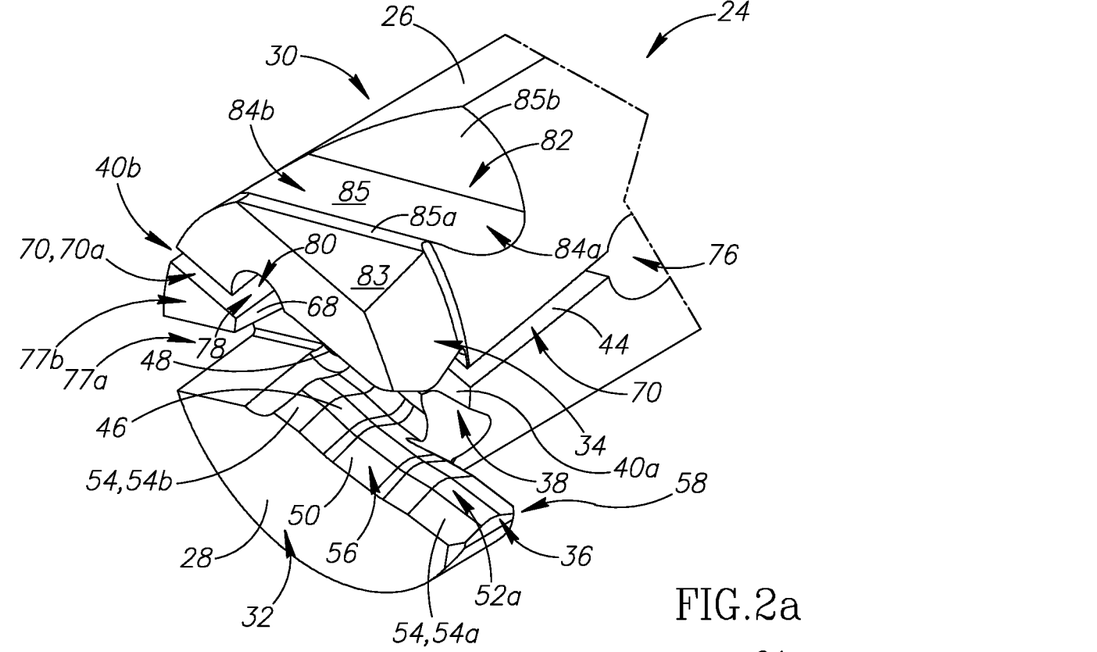
FIG. 2a is detail of FIG. 2.
Figure 2B:
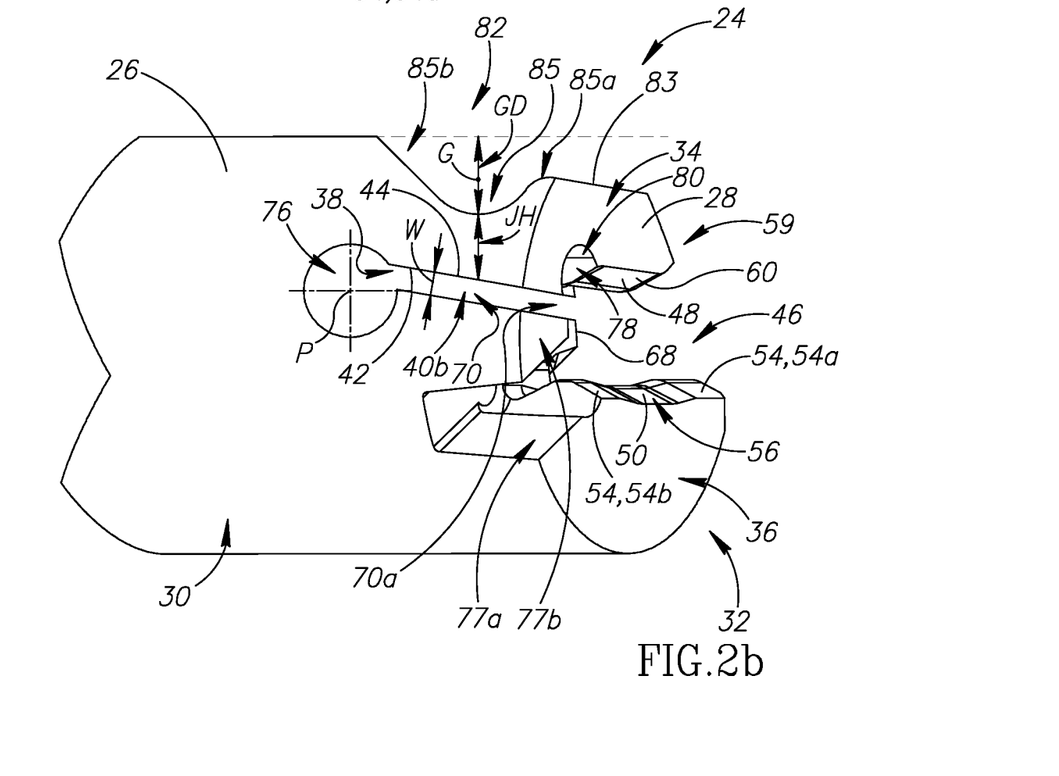
FIG. 2b is a detail of a second perspective view of the insert holder shown in FIG. 1, along a pivot axis.

Referring in particular to FIGS. 2a and 2b, in accordance with some embodiments of the subject matter of the present application, the clamping recess 38 can be defined by opposite recess upper and lower surfaces 42, 44 formed on the upper and lower jaws, respectively 34, 36. The recess upper and lower surfaces 42, 44 connect the first and second recess side openings 40a, 40b and extend to the holder end surface 28.

The upper jaw 34 is resiliently movable with respect to the lower jaw 36 by rotating around a pivot axis P. The pivot axis P is non-parallel to the holder longitudinal axis B. In accordance with some embodiments of the subject matter of the present application, the pivot axis P can be non-perpendicular to the holder longitudinal axis B. In particular, the upper jaw 34 can be configured to resiliently clamp the cutting insert 22 without the use of an additional, separate clamping device, such as a clamping screw or other fastener. Thus, the upper jaw 34 can be devoid of a though hole which opens out to the clamping recess 38 and the holder peripheral surface 26, for receiving a clamping screw.

Referring to FIG. 2a, the insert mounting portion 32 includes a transversely oriented insert receiving pocket 46, which has an insert insertion direction $D_I$ that is transverse to the holder longitudinal axis B. The insert receiving pocket 46 is configured to receive a cutting insert 22 therein. The insert receiving pocket 46 is formed in the clamping recess 38. More specifically, the insert receiving pocket 46 is defined, at least partially, by pocket upper and lower surfaces 48, 50 formed on the upper and lower jaws 34, 36, respectively. Even more specifically, the pocket upper and lower surfaces 48, 50 are located on the recess upper and lower surfaces 42, 44, respectively. The insert receiving pocket 46 extends longitudinally along the pocket longitudinal axis L to the first recess side opening 40a to define a pocket front opening 52a. The pocket front opening 52a is of sufficient dimensions to allow insertion of the cutting insert 22 into the insert receiving pocket 46. The pocket longitudinal axis L passes between the pocket upper and lower surfaces 48, 50 and passes through the pocket front opening 52a. The pocket longitudinal axis L defines opposite insert insertion and extraction directions $D_I$, $D_E$.

In accordance with some embodiments of the subject matter of the present application, the insert receiving pocket 46 can open out to the holder end surface 28. Stated differently, the insert receiving pocket 46 can be immediately adjacent to (i.e., adjoin) the holder end surface 28.

In accordance with some embodiments of the subject matter of the present application, the insert receiving pocket 46 can be in the basic form of a clamping slot, suitable for receiving elongated grooving inserts of the type known in the art (e.g. as disclosed in U.S. Pat. No. 5,833,403), which permit internal grooving of the workpiece to be performed. Also in some embodiments, the insert holder 24 may have only a single insert receiving pocket 46, rather than having two or more circumferentially spaced apart insert receiving pockets along its periphery, such as in a slotting cutter.

Figure 6:
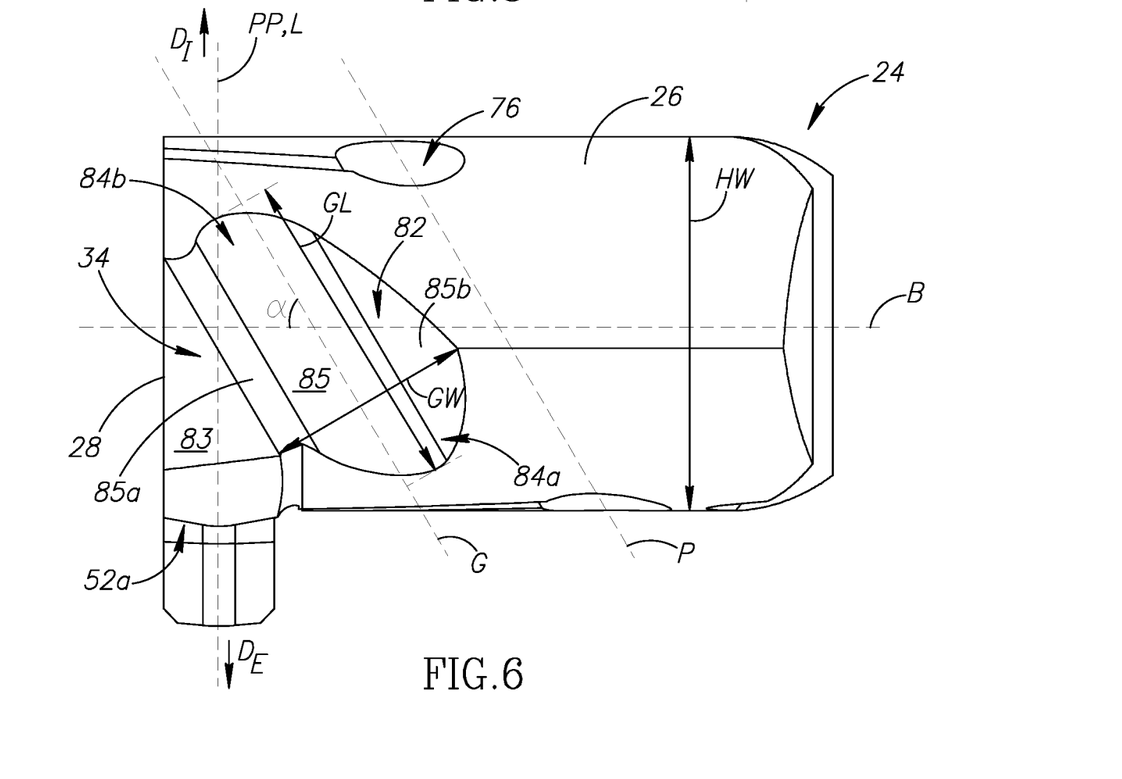
FIG. 6 is a top view of the insert holder shown in FIG. 2.
Figure 7:
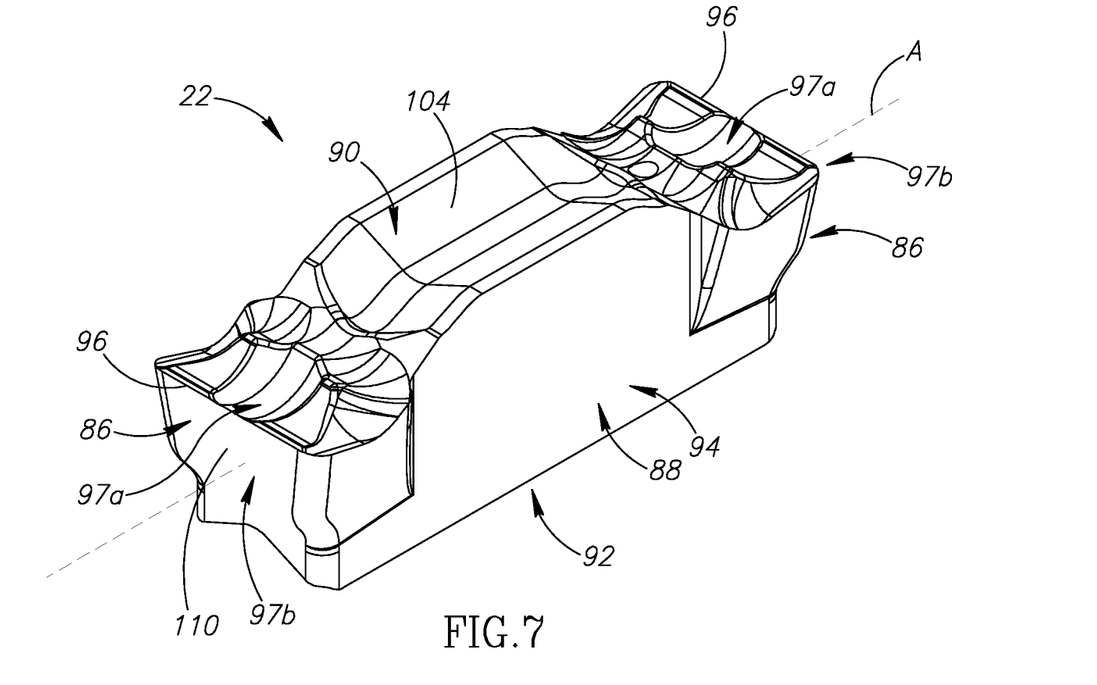
FIG. 7 is a perspective view of a cutting insert shown in FIG. 1.
Figure 8:
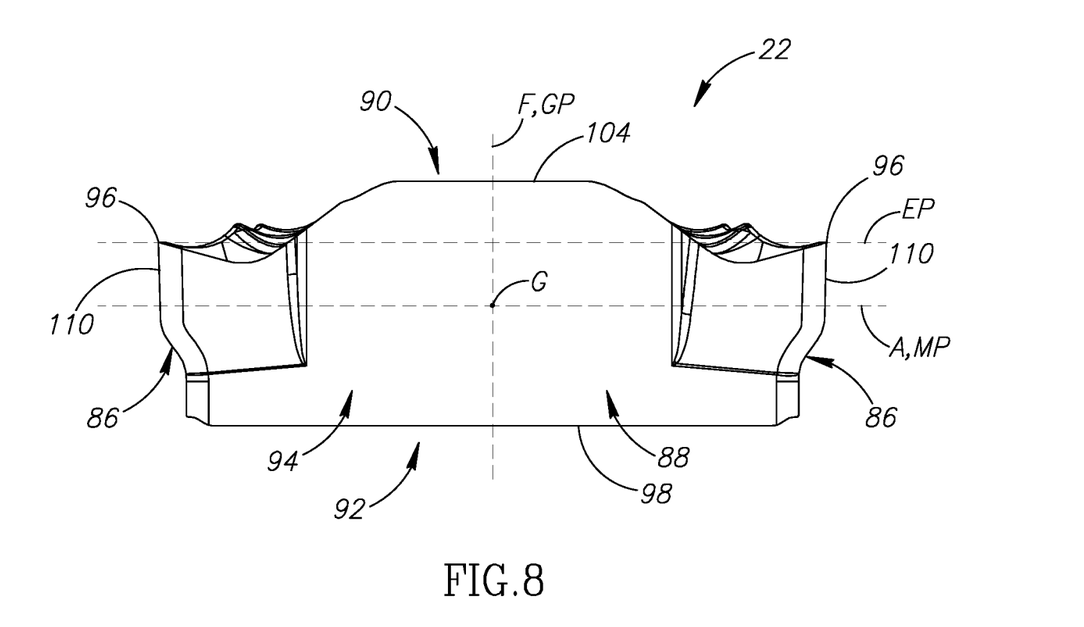
FIG. 8 is a side view of the cutting insert shown in FIG. 7.
Figure 9:
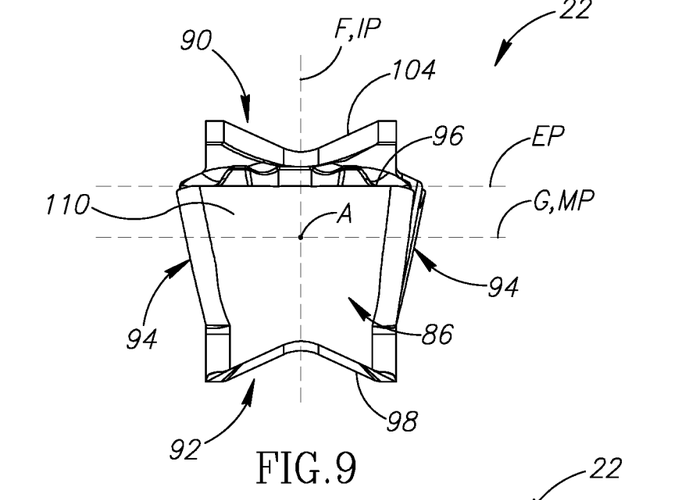
FIG. 9 is an end view of a cutting insert shown in FIG. 7.
Figure 10:
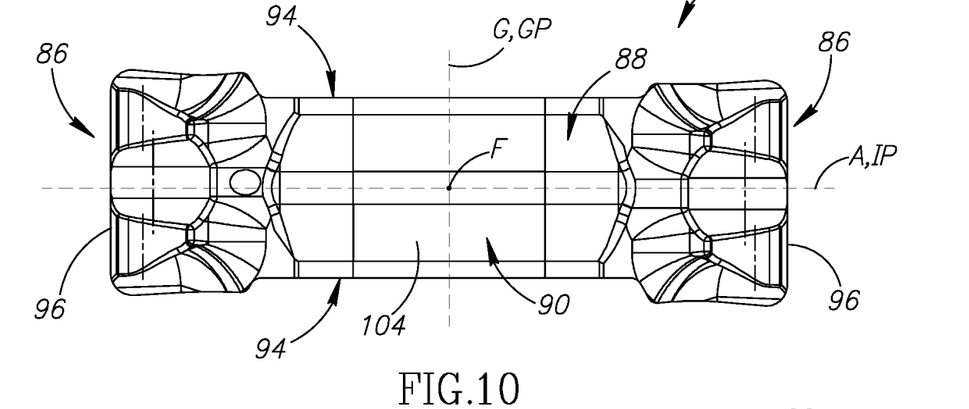
FIG. 10 is a top view of the cutting insert shown in FIG. 7.
Figure 11:
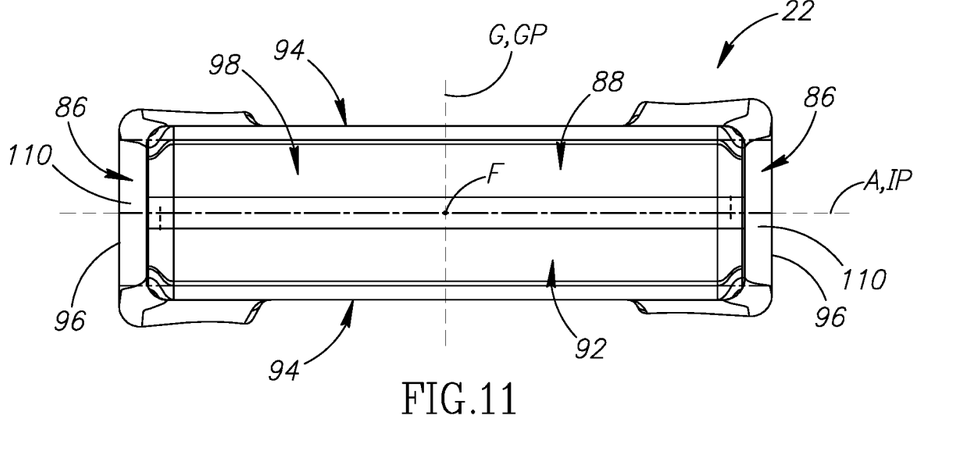
FIG. 11 is a bottom view of the cutting insert shown in FIG. 7.

The pocket upper and lower surfaces 48, 50 can be elongated. The insert receiving pocket 46 can be oriented along a transverse pocket plane PP. The transverse pocket plane PP contains the pocket longitudinal axis L and intersects the pocket upper and lower surfaces 48, 50. The transverse pocket plane PP can be transverse to the holder longitudinal axis B. In particular, the transverse pocket plane PP can be perpendicular to the holder longitudinal axis B. The insert receiving pocket 46 has a pocket longitudinal plane LP containing the pocket longitudinal axis L and passing between the pocket upper and lower surfaces 48, 50. The pocket longitudinal plane LP can be oriented perpendicular to the transverse pocket plane PP. Referring to FIG. 6, in accordance with some embodiments of the subject matter of the present application, in a top view of the tool holder 24 normal to the pocket longitudinal plane LP, the insert holder 24 has a holder width HW, measured perpendicular to the holder longitudinal axis B. Also, as seen in FIG. 3, in a front view of the insert holder 24, the holder longitudinal axis B passes through the insert receiving pocket 46. In some embodiments, the holder longitudinal axis B may intersect the pocket longitudinal axis L.

The pocket lower surface 50 includes a pocket lower clamping surface 54. The pocket lower clamping surface 54 is for firmly clamping a corresponding surface on the cutting insert 22. In accordance with some embodiments of the subject matter of the present application, the pocket lower clamping surface 54 can extend longitudinally in a direction parallel to the pocket longitudinal axis L. The insert receiving pocket 46 has a maximum pocket height H spaced away from the pocket front opening 52a, as seen in an end view of the insert holder 24 (i.e. FIG. 3), measured in a direction perpendicular to the pocket longitudinal plane LP.

Referring to FIG. 2a, in accordance with some embodiments of the subject matter of the present application, the pocket lower clamping surface 54 can include two pocket lower clamping sub-surfaces 54a, 54b which are spaced apart from each other along the pocket longitudinal axis L and in a direction away from the pocket front opening 52a, by a lower relief recess 56 recessed in the pocket lower surface 50. Each of the pocket lower clamping surfaces 54 can be concavely v-shaped.

Referring to FIG. 2a, in accordance with some embodiments of the subject matter of the present application, the insert holder 24 can include a lower support rib 58. The lower support rib 58 protrudes from the holder peripheral surface 26 and is located on the lower jaw 36 adjacent the pocket front opening 52a. The lower support rib 58 provides additional support to the cutting insert 22. The lower support rib 58 is narrower than the cutting insert 22 so as not to interfere during cutting operations. The pocket lower clamping surface 54 can extend onto the lower support rib 58 so as to extend further radially outward (relative to the holder axis B) than a corresponding surface on the upper the pocket upper surface 48 and thereby provide additional support against cutting forces.

The pocket upper surface 48 includes a pocket upper clamping surface 60. The pocket upper clamping surface 60 is for firmly clamping a corresponding surface the cutting insert 22. The pocket upper clamping surface 60 faces mutually towards the pocket lower clamping surface 54 (i.e. the pocket upper clamping surface 60 and the pocket lower clamping surface 54 face towards each other). In accordance with some embodiments of the subject matter of the present application, the pocket upper clamping surface 60 can be concavely v-shaped. The insert holder 24 can include an upper support rib 59. The pocket upper clamping surface 54 can extend onto the upper support rib 59 thereby increasing the surface contact between the pocket upper clamping surface 54 and the cutting insert 22. Thus, the upper support rib 59 can provide increased clamping to the cutting insert 22. The upper support rib 59 can protrude from the holder peripheral surface 26 and is located on the upper jaw 34 adjacent the pocket front opening 52a. As seen in FIG. 3, the upper support rib 59 can be shorter than the lower support rib 58.

Referring to FIGS. 2a and 2b, in accordance with some embodiments of the subject matter of the present application, the insert receiving pocket 46 can include at least one generally forward facing pocket axial non-abutment surface 64 formed on the lower jaw 36 which delimits the insert receiving pocket 46 in the rearward direction $D_R$ of the insert holder 24. In accordance with some embodiments of the subject matter of the present application, in a first side view of the tool holder 24 along the pocket longitudinal axis L, the insert receiving pocket 46 can have a pocket width PW, measured between the holder end surface 28 and the pocket axial non-abutment surface 64 in a direction perpendicular to the pocket longitudinal axis L.

The insert receiving pocket 46 includes a pocket stopper surface 68 formed at one of the pocket upper and lower surfaces 48, 50. The pocket stopper surface 68 is for positioning the cutting insert 22 in a predefined position when inserting the cutting insert 22 into the insert receiving pocket 46. It also serves to prevent inward displacement of the cutting insert 22 further into the insert receiving pocket 46 along the pocket longitudinal axis L during metal cutting operations. In accordance with some embodiments of the subject matter of the present application, the pocket stopper surface 68 can formed at the pocket lower surface 50.

The pocket stopper surface 68 faces generally towards the pocket front opening 52a in order to serve as a stopper. The pocket stopper surface 68 is visible in the front opening view of the insert receiving pocket 46. In accordance with some embodiments of the subject matter of the present application, the pocket stopper surface 68 can be oriented perpendicular to the pocket longitudinal axis L (and also the pocket longitudinal plane LP). The pocket stopper surface 68 can be planar.

Referring to FIGS. 2a and 2b, in accordance with some embodiments of the subject matter of the present application, the insert holder 24 can include a resilience slot 70 formed in the clamping recess 38. The insert resilience slot 70 is primarily designed to provide the desired flexibility to the upper jaw 34. The upper jaw 34 should be flexible enough to allow insertion of the cutting insert 22 into the insert receiving pocket 46. At the same time, the upper jaw 34 should be rigid enough to provide sufficient clamping of the cutting insert 22.

In accordance with some embodiments of the subject matter of the present application, the resilience slot 70 extends rearwardly from the insert receiving pocket 46. Thus, the resilience slot 70 merges with the insert receiving pocket 46. The resilience slot 70 has a maximum slot width W, as seen in a perspective view of the insert holder 24 along the pivot axis (i.e. FIG. 2b), measured in a direction perpendicular to the recess upper and lower surfaces 42, 44. The maximum slot width W can be less than the maximum pocket height H. Thus, the resilience slot 70 is narrower than the insert receiving pocket 46.

In accordance with some embodiments of the subject matter of the present application, the resilience slot 70 can include a forwardmost resilience slot portion 70a. The forwardmost resilience slot portion 70a can extend from the second recess side opening 40b to the insert receiving pocket 46 along the holder end surface 28. Thus, the insert receiving pocket 46 may not extend to the second recess side opening 40b.

Referring to FIGS. 2a to 3, in accordance with some embodiments of the subject matter of the present application, the resilience slot 70 can include a slot stress relief groove 76 where the resilience slot 70 terminates in the rearward direction $D_R$. The slot stress relief groove 76 can extend along the pivot axis P. In accordance with some embodiments of the subject matter of the present application, insert mounting portion 32 can include a key slot 77a formed in the clamping recess 38 which extends from the holder peripheral surface 26 to the insert receiving pocket 46 along the holder end surface 28. The key slot 77a is designed to receive a prong of a key to urge the cutting insert 22 in the extraction direction $D_E$ in order to extract the cutting insert 22 from the insert receiving pocket 46. The key slot 77a and the forwardmost resilience slot portion 70a can form a forwardly projecting stopper projection 77b upon which the pocket stopper surface 68 is located. It is noted that by virtue of the key slot 77a, along with the resilience slot 70, the holder end surface 28 is divided into three distinct sub surfaces. It is further noted that the stopper projection 77b is located at the lower jaw 36.

Referring to FIGS. 2a-2b, in accordance with some embodiments of the subject matter of the present application, the upper jaw 34 can include an inner flexibility groove 78 recessed in the recess upper surface 42. The inner flexibility groove 78 is designed to provide the desired flexibility to the upper jaw 34. It is also designed so that the pocket stopper surface 68 is not displaced (i.e. remains in the predefined position) during insertion of the cutting insert 22 into the insert receiving pocket 46. Finally, the inner flexibility groove 78 also provides a clearance gap for avoiding contact with any port of the cutting insert 22. As seen in FIG. 3, the inner flexibility groove 78 can open out to the holder end surface 28 at an inner flexibility groove opening 80. Referring to FIG. 2b, the inner flexibility groove 78 can extend to beyond the insert receiving pocket 46 in the rearward direction $D_R$ of the insert holder 24. The inner flexibility groove 78 can be oriented parallel to the holder longitudinal axis B.

The upper jaw 34 includes an outer flexibility groove 82 recessed in the holder peripheral surface 26. Similar to the inner flexibility groove 78, the outer flexibility groove 82 is designed to provide the desired flexibility and rigidity to the upper jaw 34. The outer flexibility groove 82 can include opposite first and second outer flexibility groove ends 84a, 84b formed at opposite longitudinal extremities of the outer flexibility groove 82, the first outer flexibility groove end 84a being adjacent the first recess opening 40a and the second outer flexibility groove end 84b being adjacent the second recess opening 40b.

In accordance with some embodiments of the subject matter of the present application, the outer flexibility groove 82 can be oriented transversely to the holder longitudinal axis B. In particular, the outer flexibility groove 82 can extend forwardly in a direction from the first recess side opening 40a towards the second recess side opening 40b. Stated differently, the first outer flexibility groove end 84a can be further from the holder end surface 28 than the second outer flexibility groove end 84b.

In accordance with some embodiments of the subject matter of the present application, the outer flexibility groove 82 can include two opposite first and second lateral groove surfaces 85a, 85b which extend between the first and second outer flexibility groove ends 84a, 84b and delimit the outer flexibility groove 82 in the widthwise direction. The first lateral groove surface 85a is closest to the holder end surface 28. The first lateral groove surface 85a can be convexly curved. The first lateral groove surface 85a can intersect the holder end surface 28. Only a portion of the first lateral groove surface 85a (for example, a point) can intersect the holder end surface 28. The second lateral groove surface 85b can be planar. The first and second lateral groove surfaces 85a, 85b can be spaced apart from each other by a central groove surface 85. The central groove surface 85 can be concavely curved.

It is noted that the outer flexibility groove 82 may not extend to the clamping recess 38 (that is to say, the outer flexibility groove 82 is not a through recess). Moreover, the outer flexibility groove 82 does not have the configuration of a chamfer which is formed, in particular, by a planar surface forming a cut-out.

The holder peripheral surface 26 can include a peripheral recessed surface 83 which extends from the outer flexibility groove 82 to the holder end surface 28. In particular, the peripheral recessed surface 83 can extend from the first lateral groove surface 85a to the holder end surface 28. The peripheral recessed surface 83 can slope towards the pocket longitudinal plane LP in the forward direction $D_F$. The peripheral recessed surface 83 can be planar. By virtue of the peripheral recessed surface 83, the upper jaw 34 above the insert receiving pocket 46 is not detrimentally weakened by the outer flexibility groove 82.

The outer flexibility groove 82 can extend between the first and second outer flexibility groove ends 84a, 84b along a groove axis G. It is noted that the outer flexibility groove 82 is longer in the direction of the groove axis G than it is wide in a perpendicular to the groove axis G. The groove axis G can be parallel to the pivot axis P. The groove axis G can form a non-zero groove angle α with the holder longitudinal axis B. The groove angle α can be greater or equal to 30° and less and or equal to 80°. Preferably, the groove angle α can be greater or equal to 50° and less and or equal to 70°. Most preferably, the groove angle α can be equal to 60°.

In accordance with some embodiments of the subject matter of the present application, in a top view of the tool holder 24 normal to the pocket longitudinal plane LP, the outer flexibility groove 82 can have a maximum groove width GW measured perpendicular to the groove axis G between the two lateral extremities of the outer flexibility groove 82. The maximum groove width GW can be greater than the pocket width PW.

In accordance with some embodiments of the subject matter of the present application, in a top view of the tool holder 24 normal to the pocket longitudinal plane LP, the outer flexibility groove 82 can have a maximum groove length GL measured parallel to the groove axis G between the two longitudinal extremities of the outer flexibility groove 82 (i.e. between the first and second outer flexibility groove ends 84a, 84b). The maximum groove length GL can be greater than half the holder width HW.

In accordance with some embodiments of the subject matter of the present application, in a perspective view of the tool holder 24 along the groove axis G (i.e. FIG. 2b), the outer flexibility groove 82 can have a maximum groove depth GD relative to the holder peripheral surface 26 measured in a direction perpendicular to the groove axis G. The upper jaw 34 can have an upper jaw height JH at the outer flexibility groove 82 measured in the same direction as the maximum groove depth GD. The maximum groove depth GD can be greater than the upper jaw height JH.

Reference is now made to FIGS. 7 to 11, showing the cutting insert 22, in accordance with the subject matter of a second aspect of the present application. The cutting insert 22 is integrally formed to have a unitary one-piece construction. The cutting insert 22 includes two opposing insert end surfaces 86 and an insert peripheral surface 88 extending between the two insert end surfaces 86. The insert peripheral surface 88 extends circumferentially about an insert longitudinal axis A. The insert longitudinal axis A defines a length direction of the insert, i.e., the direction in which the cutting insert 22 is longitudinally elongated and has is longest dimension. The insert peripheral surface 88 includes opposing insert upper and lower surfaces 90, 92 and two opposing insert side surfaces 94 all connecting the two insert end surfaces 86. In accordance with some embodiments of the subject matter of the present application, the cutting insert 22 can be devoid of a through hole, for a retaining screw.

In this non-limiting example shown in the drawings, the cutting insert 22 includes two cutting edges 96 formed at the intersection of the insert upper surface 90 and the two insert end surfaces 86, respectively. Stated differently, the cutting insert 22 can be double-ended and can be two-way indexable. However, it is noted that the present invention is not limited to double-ended cutting inserts. For example, the present invention also applies to single-ended cutting inserts having a single cutting edge 96 formed at the intersection of the insert upper surface 90 and one of the insert end surface 86. Alternatively, the cutting insert 22 can have more than two cutting edges 96. A portion of the insert upper surface 90 adjacent each cutting edge 96 serves as a rake surface 97a. A portion of each insert end surface 86 adjacent a respective cutting edge 96 serves as a relief surface 97b.

The insert longitudinal axis A intersects the insert end surfaces 86 and passes between the insert upper and lower surfaces 90, 92 and the insert side surfaces 94. An insert median plane MP located between the insert upper and lower surface 90, 92 contains the insert longitudinal axis A and intersects the two opposing insert side surfaces 94 and also the two opposing insert end surfaces 86. The insert longitudinal axis A and the insert median plane MP may be located midway between the insert upper and lower surfaces 90, 92.

The cutting insert 22 has an insert central (vertical) axis F perpendicular to, and intersecting with, the insert longitudinal axis A, and intersecting the insert upper and lower surfaces 90, 92. The insert central axis F is located midway between the insert end surfaces 86 and extends along a height direction of the insert, thereby establishing an upward-to-downward direction of the insert. An insert longitudinal plane IP located between the insert side surfaces 94, contains both the insert longitudinal axis A and the insert central axis F, and intersects the insert upper and lower surface 90, 92 and also the two opposing insert end surfaces 86. In accordance with some embodiments of the subject matter of the present application, the cutting insert 22 can exhibit mirror symmetry about the insert longitudinal plane IP.

In the double-ended configuration of the cutting insert 22, the cutting insert 22 has a cutting edge plane EP which is perpendicular to the insert central axis F and which is defined by the uppermost portions of the two cutting edges 96. In some embodiments of the insert, the two cutting edges 96 may be contained in the cutting edge plane EP.

The cutting insert 22 has an insert lateral axis G perpendicular to, and intersecting with, the insert longitudinal axis A and the insert central axis F. The insert lateral axis G extends in a width direction of the insert. In accordance with some embodiments of the subject matter of the present application (for example, the double-ended configuration of the cutting insert 22), the cutting insert 22 can exhibit 180° rotational symmetry about the insert central axis F. The insert longitudinal axis A and the insert lateral axis G may define the insert median plane MP. An insert transverse plane GP located between the insert end surfaces 86 contains both the insert lateral axis G and the insert central axis F, and intersects the insert upper and lower surfaces 90, 92 and also the two opposing insert side surfaces 94. In accordance with some embodiments of the subject matter of the present application (for example, the double-ended configuration of the cutting insert 22), the cutting insert 22 can exhibit mirror symmetry about the insert transverse plane GP.

The insert lower surface 92 includes at least one insert lower abutment surface 98. In accordance with some embodiments of the subject matter of the present application, the at least one insert lower abutment surface 98 can extend parallel to the insert longitudinal axis A. The insert lower surface 92 can include a single insert lower abutment surface 98 which is planar (not shown). In accordance with some other embodiments of the subject matter of the present application, the insert lower surface 92 can include two insert lower abutment surfaces 98 which are offset in the longitudinal direction of the cutting insert 22. Each of the insert lower abutment surfaces 98 can be convexly v-shaped, corresponding to the shape of the pocket lower clamping surface(s) 54.

The insert upper surface 90 includes an insert upper abutment surface 104. The insert upper abutment surface 104 is for abutting a corresponding surface in the insert receiving pocket 46. The insert upper abutment surface 104 face mutually away from the at least one insert lower abutment surface 98 (stated differently, the insert upper abutment surface 104 and the at least one insert lower abutment surface 98 face away from each other). The insert upper abutment surface 104 can be convexly v-shaped, corresponding to the shape of the pocket upper clamping surface 60.

At least one insert end surface 86 can include an insert stopper surface 110. In this non-limiting example shown in the drawings, both insert end surfaces 86 can include the insert stopper surface 110. The insert stopper surface 110 is for abutting the corresponding surface 68 in the insert receiving pocket 46. Each insert stopper surface 110 can be planar.

Figure 12:
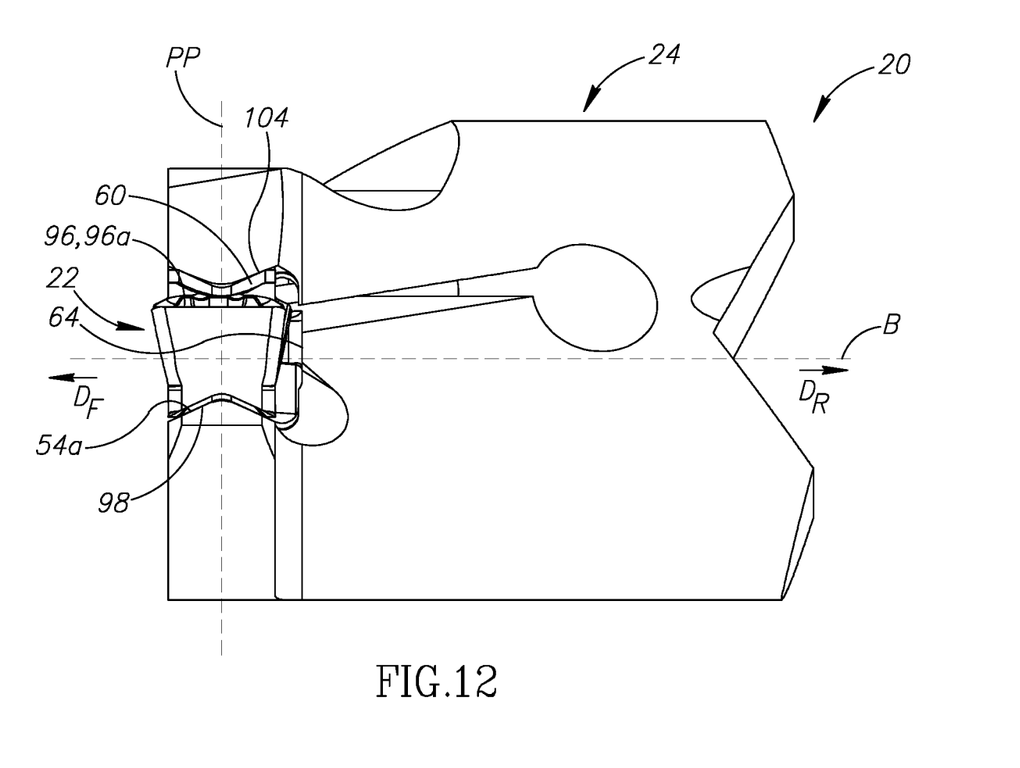
FIG. 12 is a side view of the cutting tool shown in FIG. 1.
Figure 13:
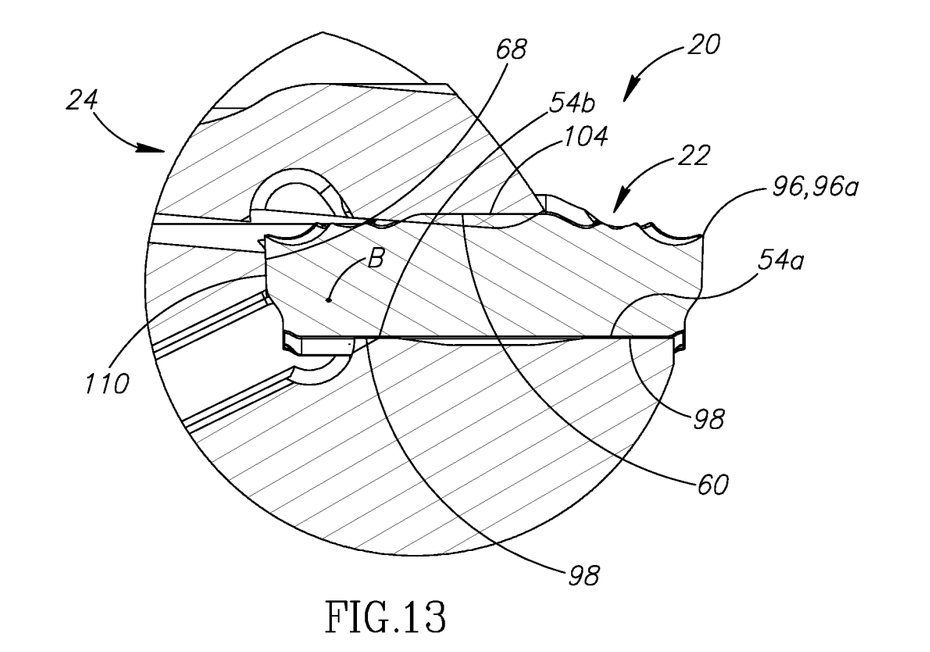
FIG. 13 is a cross section view taken in a pocket plane shown in FIG. 12.

Reference is now made to FIGS. 12 to 13, showing the cutting tool 20, in accordance with the subject matter of a third aspect of the present application. The cutting tool 20 includes the cutting insert 22 releasably and resiliently clamped in the insert receiving pocket 46 of the insert holder 24. The cutting edge 96 that is outermost (and proximate the pocket front opening 52a) forms an active cutting edge 96a.

In accordance with some embodiments of the subject matter of the present application, the pocket stopper surface 68 can abut the insert stopper surface 110. The pocket lower clamping surface 54 can abut one of the at least one insert lower abutment surfaces 98. The pocket upper clamping surface 60 can abut the insert upper abutment surface 104. The insert side surface 94 can be spaced apart from the pocket axial non-abutment surface 64.

The outer flexibility groove 82 is particularly effective in insert holders 24 designed for internal cutting operations in holes having a diameter in the order of 8 mm. For such internal cutting operations, the maximum groove length GL can be greater or equal to 4.0 mm and less than or equal to 5.5 mm. The maximum groove width GW can be greater or equal to 2.00 mm and less than or equal to 3.5 mm. The maximum groove depth GD can be greater or equal to 0.5 mm and less than or equal to 2 mm.

Although the subject matter of the present application has been described to a certain degree of particularity, it should be understood that various alterations and modifications could be made without departing from the spirit or scope of the invention as hereinafter claimed.

What is claimed is:

1. An elongated insert holder (24), having a holder longitudinal axis (B) defining opposite forward to rearward directions (DF, DR), the insert holder (24) comprising:
   a holder peripheral surface (26) extending circumferentially about the holder longitudinal axis (B), the holder peripheral surface (26) intersecting, and forming a boundary of, a holder end surface (28) at a forward end of the insert holder (24);
   a shank portion (30) and an insert mounting portion (32) located at a forward end thereof, the insert mounting portion (32) comprising:
   upper and lower jaws (34, 36) which are spaced apart by a clamping recess (38), the clamping recess (38) being recessed in the holder end surface (28) and opening out to the holder peripheral surface (26) at first and second recess side openings (40a, 40b), the upper jaw (34) being resiliently movable with respect to the lower jaw (36) by rotating around a pivot axis (P); and
   a transversely oriented insert receiving pocket (46) configured to receive a cutting insert therein, the insert receiving pocket (46) being formed in the clamping recess (38) and defined, at least partially, by pocket upper and lower surfaces (48, 50) formed on the upper and lower jaws (34, 36), respectively, and extending longitudinally along a pocket longitudinal axis (L) to the first recess side opening (40a) to define a pocket front opening (52a); wherein:
      a pocket longitudinal plane (LP) located between the pocket upper and lower surfaces (48, 50) contains the pocket longitudinal axis (L);
      the pocket lower surface (50) comprises a pocket lower clamping surface (54);
      the pocket upper surface (48) comprises a pocket upper clamping surface (60) which faces mutually towards the pocket lower clamping surface (54);
      the insert receiving pocket (46) comprises a pocket stopper surface (68) formed at one of the pocket upper and lower surfaces (48, 50), facing generally towards the pocket front opening (52a); and
      the upper jaw (34) comprises an outer flexibility groove (82) recessed in the holder peripheral surface (26), and is configured to resiliently clamp a cutting insert in the insert receiving pocket (46) without the use of an additional, separate clamping device.

2. The insert holder (24), according to claim 1, wherein the pocket stopper surface (68) is formed at the pocket lower surface (50).

3. The insert holder (24), according to claim 1, wherein:
   the insert receiving pocket (46) is oriented along a transverse pocket plane (PP) which contains the pocket longitudinal axis (L), and which intersects the pocket upper and lower surfaces (48, 50); and
   the transverse pocket plane (PP) is transverse to the holder longitudinal axis (B).

4. The insert holder (24), according to claim 3, wherein the transverse pocket plane (PP) is perpendicular to the holder longitudinal axis (B).

5. The insert holder (24), according to claim 1, wherein the insert receiving pocket (46) opens out to the holder end surface (28).

6. The insert holder (24), according to claim 1, comprising an upper support rib (59) which protrudes from the holder peripheral surface (26) and is located on the upper jaw (34) adjacent the pocket front opening (52a).

7. The insert holder (24), according to claim 1, comprising a lower support rib (58) which protrudes from the holder peripheral surface (26) and is located on the lower jaw (36) adjacent the pocket front opening (52a).

8. The insert holder (24), according to claim 1, comprising a resilience slot (70) formed in the clamping recess (38) and extending rearwardly from the insert receiving pocket (46).

9. The insert holder (24), according to claim 8, wherein the resilient slot (70) comprises a forwardmost resilience slot portion (70a) which extends from the second recess side opening (40b) to the insert receiving pocket (46) along the holder end surface (28).

10. The insert holder (24), according to claim 9, wherein the insert mounting portion (32) comprises a key slot (77a) formed in the clamping recess (38) which extends from the holder peripheral surface (26) to the insert receiving pocket (46) along the holder end surface (28) so that the key slot (77a) and the forwardmost resilience slot portion (70a) form a forwardly projecting stopper projection (77b) upon which the pocket stopper surface (68) is located.

11. The insert holder (24), according to claim 8, wherein:
   the resilience slot (70) comprises a slot stress relief groove (76) at which it terminates in the rearward direction (DR); and
   the slot stress relief groove (76) extends along the pivot axis (P).

12. The insert holder (24), according to claim 1, wherein:
   the clamping recess (38) is defined by opposite recess upper and lower surfaces (42, 44) formed on the upper and lower jaws, respectively (34, 36); and
   the upper jaw (34) comprises an inner flexibility groove (78) recessed in the recess upper surface (42).

13. The insert holder (24), according to claim 12, wherein the inner flexibility groove (78) opens out to the holder end surface (28) at an inner flexibility groove opening (80) and extends to beyond the insert receiving pocket (46) in the rearward direction (DR) of the insert holder (24).

14. The insert holder (24), according to claim 1, wherein the outer flexibility groove (82) extends to beyond the insert receiving pocket (46) in the rearward direction (DR) of the insert holder (24).

15. The insert holder (24), according to claim 1, wherein:
   the insert receiving pocket (46) is oriented along a transverse pocket plane (PP);
   the pocket longitudinal plane (LP) is perpendicular to the transverse pocket plane (PP); and
   the holder peripheral surface (26) comprises a peripheral recessed surface (83) extending from the outer flexibility groove (82) to the holder end surface (28), the peripheral recessed surface (83) sloping towards the pocket longitudinal plane (LP) in the forward direction (DF).

16. The insert holder (24), according to claim 15, wherein the peripheral recessed surface (83) is planar.

17. The insert holder (24), according to claim 1, wherein the pivot axis (P) is non-perpendicular to the holder longitudinal axis (B).

18. The insert holder (24), according to claim 1, wherein the outer flexibility groove (82) is oriented transversely to the holder longitudinal axis (B).

19. The insert holder (24), according to claim 18, wherein:
the outer flexibility groove (82) comprises opposite first and second outer flexibility groove ends (84a, 84b) formed at opposite longitudinal extremities thereof, the first outer flexibility groove end (84a) being adjacent the first recess side opening (40a) and the second outer flexibility groove end (84b) being adjacent the second recess side opening (40b).

20. The insert holder (24), according to claim 19, wherein:
the first outer flexibility groove end (84a) is further from the holder end surface (28) than the second outer flexibility groove end (84b).

21. The insert holder (24), according to claim 19, wherein:
the outer flexibility groove (82) comprises two opposite first and second lateral groove surfaces (85a, 85b) extending between the first and second outer flexibility groove ends (84a, 84b), the first lateral groove surface (85a) being closer to the holder end surface (28) than the second lateral groove surface (85b); and
the first lateral groove surface (85a) is convexly curved.

22. The insert holder (24), according to claim 21, wherein the first lateral groove surface (85a) intersects the holder end surface (28).

23. The insert holder (24), according to claim 19, wherein the outer flexibility groove (82) extends longitudinally along a groove axis (G).

24. The insert holder (24), according to claim 23, wherein, the groove axis (G) forms a non-zero groove angle (α) with the holder longitudinal axis (B).

25. The insert holder (24), according to claim 23, wherein the groove angle (α) is in the range, 30°≤α≤80°.

26. The insert holder (24), according to claim 23, wherein the groove axis (G) is parallel to the pivot axis (P).

27. The insert holder (24), according to claim 23, wherein:
in a top view of the tool holder (24) normal to the pocket longitudinal plane (LP), the outer flexibility groove (82) has a maximum groove width (GW) measured perpendicular to the groove axis (G) between the two lateral extremities of the outer flexibility groove (82);
in a first side view of the tool holder (24) along the pocket longitudinal axis (L), the insert receiving pocket (46) has a pocket width (PW) measured perpendicular to the pocket longitudinal axis (L); and
the maximum groove width (GW) is greater than the pocket width (PW).

28. The insert holder (24), according to claim 23, wherein in a top view of the tool holder (24) normal to the pocket longitudinal plane (LP):
the outer flexibility groove (82) has a maximum groove length (GL) measured parallel to the groove axis (G) between the two longitudinal extremities of the outer flexibility groove (82);
the insert holder (24) has a holder width (HW) measured perpendicular to the holder longitudinal axis (B); and
the maximum groove length (GL) is greater than half the holder width (HW).

29. The insert holder (24), according to claim 23, wherein in a perspective view of the tool holder (24) along the groove axis (G):
the outer flexibility groove (82) has a maximum groove depth (GD) relative to the holder peripheral surface (26) measured in a direction perpendicular to the groove axis (G);
the upper jaw (34) has an upper jaw height (JH) at the outer flexibility groove (82) measured in the same direction as the maximum groove depth (GD); and
the maximum groove depth (GD) is greater than half the upper jaw height (JH).

30. The insert holder (24), according to claim 1, wherein the shank portion (30) and the insert mounting portion (32) are integrally formed together to have unitary one-piece construction.

31. The insert holder (24), according to claim 1, wherein the upper jaw (34) is devoid of a though hole opening out to the clamping recess (38) and the holder peripheral surface (26).

32. The insert holder (24), according to claim 1, wherein:
the insert holder (24) has only a single insert receiving pocket (46); and
in a front view of the insert holder (24), the holder longitudinal axis (B) passes through the insert receiving pocket (46).

33. A cutting tool (20) comprising:
an insert holder (24) in accordance with claim 1; and
a cutting insert (22), releasably and resiliently clamped in the insert receiving pocket (46).

34. The cutting tool (20) according to claim 33, wherein:
the cutting insert (22) is longitudinally elongated in a direction defining an insert longitudinal axis (A) and comprises:
two opposing insert end surfaces (86) and an insert peripheral surface (88) extending therebetween, the insert peripheral surface (88) extending circumferentially about the insert longitudinal axis (A) and comprising opposing insert upper and lower surfaces (90, 92) and two opposing insert side surfaces (94) which all connect the two insert end surfaces (86); and
a cutting edge (96) formed at the intersection of the insert upper surface (90) and a first one of the two insert end surfaces (86); wherein:
the insert lower surface (92) comprises an insert lower abutment surface (98);
the insert upper surface (90) comprises an insert upper abutment surface (104) which mutually faces away from the at least one insert lower abutment surface (98); and
a second one of the two the insert end surfaces (86) comprises an insert stopper surface (110).

35. The cutting tool (20), according to claim 34, wherein:
the pocket stopper surface (68) abuts the insert stopper surface (110);
the pocket lower clamping surface (54) abuts the insert lower abutment surfaces (98); and
the pocket upper clamping surface (60) abuts the insert upper abutment surface (104).

36. The cutting tool (20), according to claim 34, wherein:
the cutting insert (22) comprises two cutting edges (96) and two insert stopper surfaces (110) so that the cutting insert (22) is double-ended.

37. An elongated insert holder (24), having a holder longitudinal axis (B) defining opposite forward to rearward directions (DF, DR), the insert holder (24) comprising:

a holder peripheral surface (26) extending circumferentially about the holder longitudinal axis (B), the holder peripheral surface (26) intersecting, and forming a boundary of, a holder end surface (28) at a forward end of the insert holder (24);

a shank portion (30) and an insert mounting portion (32) located at a forward end thereof, the insert mounting portion (32) comprising:

upper and lower jaws (34, 36) which are spaced apart by a clamping recess (38), the clamping recess (38) being recessed in the holder end surface (28) and opening out to the holder peripheral surface (26) at first and second recess side openings (40a, 40b), the upper jaw (34) being resiliently movable with respect to the lower jaw (36) by rotating around a pivot axis (P); and a single, transversely oriented insert receiving pocket (46) configured to receive a cutting insert therein, the insert receiving pocket (46) being formed in the clamping recess (38) and defined, at least partially, by pocket upper and lower surfaces (48, 50) formed on the upper and lower jaws (34, 36), respectively, and extending longitudinally along a pocket longitudinal axis (L) to the first recess side opening (40a) to define a pocket front opening (52a); wherein:

a pocket longitudinal plane (LP) located between the pocket upper and lower surfaces (48, 50) contains the pocket longitudinal axis (L);

the pocket lower surface (50) comprises a pocket lower clamping surface (54);

the pocket upper surface (48) comprises a pocket upper clamping surface (60) which faces mutually towards the pocket lower clamping surface (54);

the insert receiving pocket (46) comprises a pocket stopper surface (68) formed at one of the pocket upper and lower surfaces (48, 50), facing generally towards the pocket front opening (52a);

the upper jaw (34) comprises an outer flexibility groove (82) recessed in the holder peripheral surface (26); and in a front view of the insert holder (24), the holder longitudinal axis (B) passes through the insert receiving pocket (46).

\* \* \* \* \*